United States Patent [19]

Kitagawa

[11] Patent Number: 5,736,283
[45] Date of Patent: Apr. 7, 1998

[54] PHOTOCONDUCTOR FOR ELECTROPHOTOGRAPHY

[75] Inventor: Seizo Kitagawa, Kawasaki, Japan

[73] Assignee: Fuji Electric Co., Ltd., Kanagawa, Japan

[21] Appl. No.: 719,943

[22] Filed: Sep. 25, 1996

[30] Foreign Application Priority Data

Sep. 26, 1995 [JP] Japan .................................. 7-247083

[51] Int. Cl.$^6$ .................................................. G03G 5/047
[52] U.S. Cl. ........................................ 430/59; 430/58
[58] Field of Search ................................... 430/58, 59

[56] References Cited

U.S. PATENT DOCUMENTS

| 4,302,521 | 11/1981 | Takei et al. | 430/59 |
| 4,387,147 | 6/1983 | Sakai | 430/59 |
| 5,478,684 | 12/1995 | Nakamura et al. | 430/58 |

FOREIGN PATENT DOCUMENTS

| 57-98523 | 6/1982 | Japan . |
| 4-358157 | 12/1992 | Japan . |

*Primary Examiner*—Roland Martin
*Attorney, Agent, or Firm*—Spencer & Frank

[57] ABSTRACT

A photoconductor for electrography suitable for use in an electrophotography-applied apparatus of a wet development type includes a conductive substrate, a photosensitive layer provided on the conductive substrate, having a charge generating layer and a charge transporting layer provided on the charge generating layer and as an outermost layer of the photosensitive layer. Each of the charge generating layer and charge transporting layer contains an organic material as a main component. A subbing layer may be provided between the conductive substrate and the charge generating layer. The outermost layer of the photosensitive layer contains a poly(2,6-dimethoxyanthracene-9,10-diolyl alkanedioate) and a low molecular weight charge transporting material. The charge transporting layer covers the charge generating layer and the optional subbing layer including their end portions.

20 Claims, 1 Drawing Sheet

PHOTOCONDUCTOR FOR ELECTROPHOTOGRAPHY

BACKGROUND OF THE INVENTION

1. Field of the Invention

The present invention relates to a photoconductor for electrophotography and more particularly to an organic photoconductor for electrophotography excellent in resistance to solvents and used advantageously in wet development type electrophotography applied apparatuses.

2. Description of Related Art

Electrophotography applied apparatuses are divided into two main classes by the type of development system, i.e., dry and wet development systems. The dry development system is a system where the surface of a photoconductor on which static potential images are formed is contacted with or dipped in a developer comprising an insulating solvent such as alkanes, ketones and the like, having dispersed therein toner particles bearing charges, so that the toner particles can be attached to the static potential images under electric field formed between the static potential images and a developing electrode. In the wet development method, toners having a small particle size can be used as compared in the case of the dry development system and, hence, a larger amount of charges accumulates on the toner, deformation of toner images scarcely occurs, and edge effect decreases, with the result that images having high resolution and improved gradation reproducibility can be obtained. Therefore, in recent years, electrophotography applied apparatuses based on a wet development system have been developed on a magnificent scale.

Since in wet development systems the surface of the photoconductor directly contacts the developer or is dipped in the developer, the photoconductor must have a sufficient solvent resistance. In this regard, inorganic photoconductors have heretofore been used in the main. However, recently organic photoconductors having high solvent resistance have been developed and put into practical use. Such practically used organic photoconductors have a structure of function-separated laminate photoconductor structure in which at least one charge generating layer and at least one charge transporting layer are laminated on a conductive substrate, the charge transporting layer made of a material having a high solvent resistance serving as the outermost layer so that they are suited for a wet development system. As the high solvent resistance material for such photoconductors, there has been known, for example, poly (2,6-dimethoxyanthracene-9,10-diolyl alkanedioate) resins as disclosed in Japanese Patent Application Laying-open No. 358157/1992.

However, when the outermost layer of a photoconductor is made of the above-described poly(2,6-dimethoxyanthracene-9,10-diolyl alkanedioate) resin exclusively, there arises the problem that residual potential increases under the conditions of high temperature and high humidity and the absolute value of light potential increases to deteriorate the quality of image although the solvent resistance of the photoconductor.

There arises another problem that upon development, the solvent in the developer penetrates into the component layers of the photoconductor from both edge portions of the outermost layer and the layers lying inside are exposed to and attacked by the solvent, resulting in separation of one or more of the layers when mechanical stresses are applied by, for example, a cleaner.

Further, in the wet development system, general procedures upon development involve contacting a developer on the surface of a photo conductor or dipping the surface of a photoconductor in a developer and thereafter sweeping the surface of the photoconductor with a squeeze roller to control the thickness of the developer layer on the surface of the photoconductor. For this purpose, it has been necessary to take a measure such as to provide an electrophotography applied apparatus with a mechanism which controls the distance between the surface of the squeeze roller and the surface of the outermost layer of the photoconductor in compliance with the thickness of the layer of developer or to provide the surface of the squeeze roller facing the outermost layer of the photoconductor with a stepped portion or depression having a depth which corresponds to the desired thickness of the layer of developer.

SUMMARY OF THE INVENTION

The present invention has been achieved with view to obviating the above-described disadvantages of the prior art.

An object of the present invention is to provide an organic photoconductor which is excellent in solvent resistance and which maintains stably acceptable image quality even at high temperatures and high humidities.

Another object of the present invention is to provide an organic photoconductor which scarcely suffer separation of the component layers of the photoconductor due to interaction with a developer.

Still another object of the present invention is to provide an organic photoconductor having means for controlling the thickness of a developer which attaches to the surface of the photoconductor.

Accordingly, the present invention provides a photoconductor for electrography comprising: a conductive substrate; a photosensitive layer provided on the conductive substrate, comprising a charge generating layer provided on the substrate; and a charge transporting layer provided on the charge generating layer as an outermost layer of the photoconductor; wherein the charge generating layer and charge transporting layer comprise each an organic material as a main component, the outermost layer comprising a poly(2,6-dimethoxyanthracene-9,10-diolyl alkanedioate) and a low molecular weight charge transporting material.

Here, the poly(2,6-dimethoxyanthracene-9,10-diolyl) may preferably be poly(2,6-dimethoxyanthracene-9,10-diolyl dodecanedioate).

The low molecular weight charge transporting material may preferably be a hydrazone compound.

The hydrazone compound may be contained in the outermost layer preferably in an amount of 5 to 20% by weight based on the weight of the outermost layer.

The photoconductor may further include a subbing layer between the conductive substrate and the charge generating layer.

The outermost layer may cover one or more layers of the photosensitive layer entirely.

The conductive substrate may comprise a cylinder made of an aluminum-based material having a non-coated region in a surface of the conductive substrate in each peripheral end portion thereof, and on the peripheral end portion may be provided an Alumite layer having a height larger than that of the outermost layer.

The difference between the height of the surface of the outermost layer of the photosensitive layer and that of the surface of the Alumite layer may be 29 μm±10 μm.

The above and other objects, effects, features and advantages of the present invention will become more apparent

DETAILED DESCRIPTION OF THE INVENTION

Figure 1:
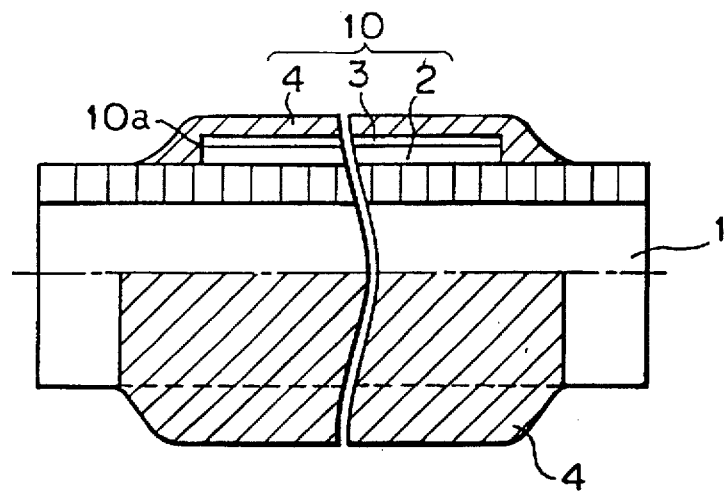
FIG. 1 is a partial cross sectional view showing a photoconductor fabricated according to an embodiment of the present invention.

According to the present invention, the first problem described above is solved as follows. That is, in a photoconductor for electrophotography which includes a conductive substrate and at least one charge generating layer and at least one charge transporting layer laminated on the substrate so that the charge transporting layer is the outermost layer, the charge generating and charge transporting layers comprising an organic material as the main component, use is made of poly(2,6-dimethoxyanthracene-9,10-diolyl alkanedioate ester) resins together with other low molecular weight charge transporting material in the outermost layer.

The poly(2,6-dimethoxyanthracene-9,10-diolyl alkanedioate ester) resins, classified into polyester resins, have high solvent resistance but a decreased crystallinity due to inclusion of dimethoxyanthracene structure in the molecule and, hence, have a slightly decreased solvent resistance as compared with the conventional polyesters and are dissolved to some extent in particular solvents. Therefore, it is possible to dissolve a poly(2,6-dimethoxyanthracene-9,10-diolyl alkanedioate ester) resin in a particular solvent to prepare a coating solution and form a coating film therefrom. In spite of this, the coating film thus formed does not soften, swell or crack with or dissolve in the solvents or suffer other undesirable phenomena to be caused by the solvents which are conventionally used in the developers employed in wet development systems. However, the poly(2,6-dimethoxyanthracene-9,10-diolyl alkanedioate) resins have the property that the mobility of charge carrier decreases under the conditions of high temperature and high humidity due to penetration of moisture and, hence, photoconductors having a charge transport layer containing only a poly(2,6-dimethoxyanthracene-9,10-diolyl alkanedioate) resin as the charge transporting material has the disadvantage that the residual potential of the photoconductor increases in an atmosphere of high temperature and high humidity. It has now been found that use of one or more of known charge transporting materials in combination with the poly(2,6-dimethoxyanthracene-9,10-diolyl alkanedioate) resins is useful in order to eliminate the disadvantage described above.

The poly(2,6-dimethoxyanthracene-9,10-diolyl alkanedioate) resins which can be used in the present invention are compounds represented by formula (I) below:

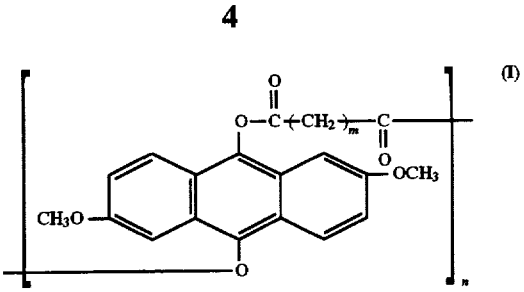

wherein m is an integer of 1 or more, n is preferably 100 to 400. The ratio of the weight average molecular weight to the number average molecular weight (Mw/Mn) is preferably 3 to 5 (cf. Japanese Patent Application Laying-open No. 358157/1992).

Specific examples of the poly(2,6-dimethoxyanthracene-9,10-diolyl alkanedioate) resins include poly(2,6-dimethoxyanthracene-9,10-diolyl nonanedioate), poly(2,6-dimethoxyanthracene-9,10-diolyl decanedioate), poly(2,6-dimethoxyanthracene-9,10-diolyl undecanedioate), poly(2,6-dimethoxyanthracene-9,10-diolyl dodecanedioate), poly(2,6-dimethoxyanthracene-9,10-diolyl tridecanedioate), poly(2,6-dimethoxyanthracene-9,10-diolyl tetradecanedioate), poly(2,6-dimethoxyanthracene-9,10-diolyl pentadecanedioate), and the like. Among these, poly(2,6-dimethoxyanthracene-9,10-diolyl dodecanedioate) is preferred. As the low molecular weight charge transporting material which can be used in combination with the poly(2,6-dimethoxyanthracene-9,10-diolyl alkanedioate) resins in the present invention, there can be cite, for example, hydrazone compounds, styril compounds, enamine compounds, amine compounds and the like. Among these, hydrazone compounds are preferred. The amount of the hydrazone compounds to be added is within the range of 5 to 20% by weight based on the weight of charge generating layer.

According to the present invention, the second problem described above is solved by completely covering with the outermost layer the inner layers of the photoconductor including the edge portions thereof. Covering even the edge portions of the inner layers prevents, upon development, prevents the solvent in the developer from penetrating into the inner layers so that deterioration of the inner layers with the solvent can be avoided.

According to the present invention, the third problem described above is solved by provision of a cylinder made of an aluminum-based material as the conductive substrate, whose peripheral end portions have respective regions where no photoconductor layer is formed and an Alumite layer is provided on each of the end portions of the photoconductor layer-lacking substrate, the surface of the Alumite layer being made higher than that of the outermost layer of the photoconductor. The difference in height between the surface of the Alumite layer and that of the outermost layer of the photoconductor corresponds to the thickness of the developer layer which attaches to the surface of the outermost layer of the photoconductor upon development. This difference may be set up to, for example, 29 µm±10 µm.

The photoconductor of the present invention may be constructed in a desired design as far as it has a charge generating layer and a charge transporting layer, both made of an organic material as the main component, and the charge transporting layer constitutes the outermost layer of the photoconductor. For example, the photoconductor can be constructed as follows. That is, a subbing layer is provided on a conductive substrate and a charge generating layer and a charge transporting layer are provided on the subbing layer in order. Hereafter, description will be made on this type of photoconductor. However, the present invention is not limited to such an example.

As the conductive substrate for photoconductors intended to achieve the first and second objects above of the present invention, there can be used known materials, e.g., metals such as aluminum, stainless steel and nickel, conductive resins and the like. Those materials that are obtained by coating a conductive material on glass, resin or the like substrate. The shape of photoconductor is not limited particularly and there may be used any shape such s cylindrical, plate-like, sheet-like or the like shape. In the photoconductors intended to achieve the third object above of the present invention, conductive substrates made of an aluminum-based material can be used.

The subbing layer may be formed as a film formed by coating a coating composition containing a known material such as solvent-soluble polyamide, polyvinyl alcohol, polyvinyl butyral, casein or the like as the main component. Further, the subbing layer may contain one or more of metal oxide fine powder, antioxidant and the like additives.

The charge generating layer can be formed by coating on a conductive substrate or a subbing layer on the conductive substrate a coating solution comprising an organic charge generating material and a binder resin dispersed or dissolved in an organic solvent. Various substances can be used as the charge generating material and examples thereof include phthalocyanine pigments, bisazo pigments, polycyclic quinone pigments and the like. Among these, appropriate materials are selected depending on the wavelength region of light for exposure used for image formation. As the binder resin, there can be used various resins such as polycarbonates, polyesters, polyamides, polyurethanes, epoxy resins, silicone resins, homopolymers and copolymers of methacrylate and the like either singly or in combination of two or more of them.

On the charge generating layer is coated a coating solution comprising poly(2,6-dimethoxyanthracene-9,10-diolyl dodecanedioate), other low molecular weight charge transporting material dissolved in an organic solvent to form a charge transporting layer to complete a photoconductor. Thus, a photoconductor having an acceptable image quality even in an atmosphere of high temperature and high humidity.

Now, referring to FIG. 1, which is a partial cross sectional view showing a photoconductor according to an embodiment of the present invention, formation of the charge transporting layer is described. In FIG. 1, reference numeral 1 denotes a conductive substrate which has a cylindrical shape. On the conductive substrate 1 are formed a subbing layer 2 and a charge generating layer 3 in order. Then, a charge transporting layer 4 is formed on the charge generating layer 3. The charge generating layer 3, the charge transporting layer 4 together with the subbing layer 2 which is optional constitute a photosensitive layer 10. The charge transporting layer 4 is formed by coating a coating solution on the charge generating layer 3 so that the charge generating layer 3 can be covered entirely including peripheral end portions 10a of the photosensitive layer 10. This construction prevents a developer from penetrating into the layers inside the charge generating layer 4, which is outermost, thus giving rise to a photoconductor having excellent solvent resistance.

Figure 2:
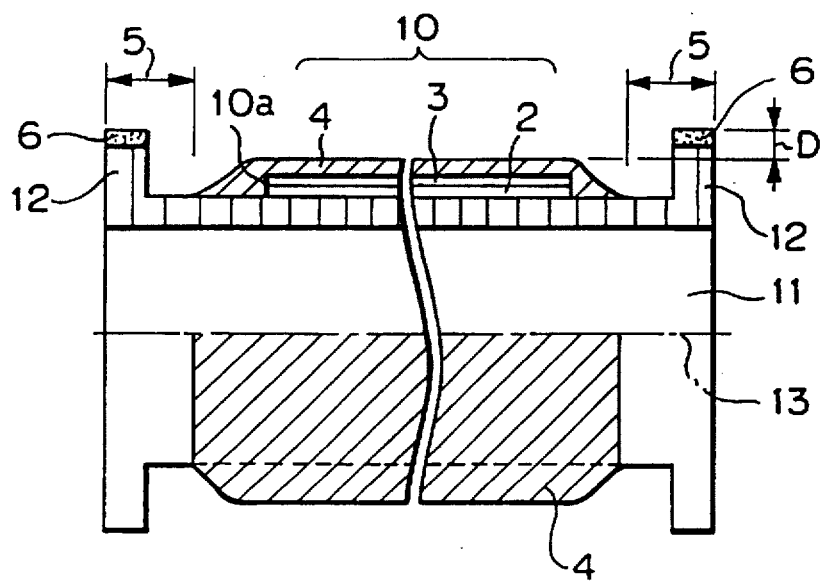
FIG. 2 is a partial cross sectional view showing a photoconductor fabricated according to another embodiment of the present invention.

FIG. 2 is a cross sectional view showing a photoconductor according to another embodiment of the present invention. As shown in FIG. 2, a cylindrical conductive substrate 11, which is made of an aluminum-based material, has end portions or flanges 12 on both sides, which are integral to the conductive substrate and have a cylindrical shape having a larger diameter than the cylindrical conductive substrate 11. In a central portion of the peripheral surface of the cylindrical conductive substrate 11 is provided a photosensitive layer 10 which is formed by laminating a subbing layer 2, a charge generating layer 3 and a charge transporting layer in order. The construction of the subbing layer 2, the charge generating layer 3 and the charge transporting layer 4 may be the same as those in the embodiment shown in FIG. 1. The charge transporting layer 4 covers the charge generating layer 3 and subbing layer 2 entirely including their end portions or the end portion 10a of the photosensitive layer 10. The peripheral surface of the conductive substrate 1 including the end portions 12 has on each side thereof a non-coated region 5 where there is formed no coating film. Each end portion or flange 12 has on its peripheral surface an Alumite layer 6. The diameter of the flange 12 including the Alumite layer 6 is set so that the difference in height between the height of the top of the Alumite layer 6 and the top of the charge transporting layer or outermost layer 4 from a central axis 13 of the conductive substrate 11 is a distance D. Thus, the photoconductor has a stepped or depressed portion having a depth of D on its peripheral surface, the stepped surface and the surface of the Alumite layer 6 being intervened by a non-coated region on each side. With this construction, a development operation can be performed by running a squeeze roller such that the surface of the roller contacts and moves along the peripheral surface of the photoconductor. Then, the amount of the developer which attaches to the surface of the charge transporting layer 4 can be controlled to be uniform radially and longitudinally due to the existence of the stepped portion or surface in a depth of D. As a result, there is no need for providing separately a mechanism for controlling the distance between the surface of the squeeze roller and the surface of the charge transporting layer 4 to be constant or for providing a stepped portion or depression in the surface of the squeeze roller in order to control the amount of the developer.

According to the present invention, use of a charge transporting layer made of a poly(2,6-dimethoxyanthracene-9,10-diolyl alkanedioate) and a low molecular weight charge transporting material as the outermost layer of a photoconductor including a conductive substrate having thereon a charge generating layer and a charge transporting layer each comprising an organic material containing as the main component an organic material, gives rise to an organic photoconductor which is excellent in solvent resistance and suitable for use in an electrophotography-applied apparatus of a wet development type.

Further, in the photoconductor according to the present invention, the outermost layer having an excellent solvent resistance covers the layers lying inside thereof entirely including the end portions of the inner layers, which structure effectively prevents penetration of a developer into the inside layers of the photoconductor from the end portions thereof and subsequent separation of the layers from the end portions of the photoconductor.

In addition, use of a cylinder made of an aluminum-based material having a non-coated region on each peripheral end portion, a part of the non-coating region having an Alumite layer which is higher than the outermost layer of the photoconductive laminates so that a squeeze roller can be received on the surfaces of the Alumite layers, enables one to control the thickness of the layer of a developer without necessity for providing a stepped portion or depression in the surface of the squeeze roller to be used or separately providing in the photoconductor of a mechanism for controlling the thickness of the layer of a developer on the surface of the charge transporting layer of the photoconductor.

EXAMPLES

Hereinafter, the present invention will be described in greater detail by examples. However, the present invention should not be construed as being limited thereto.

Example 1

On the outer peripheral surface of a cylindrical conductive substrate (outer diameter: 60 mm, thickness: 1 mm, length: 348 mm) made of an aluminum alloy was formed a subbing layer of 0.5 µm thick made of a soluble polyamide (Daiamide T-171, trade name, produced by Daicel Hülls Co., Ltd.). The subbing layer thus formed was dipped in a coating solution prepared by mixing for dispersion 60 parts by weight of metal-free phthalocyanine and 40 parts by weight of polymethyl methacrylate together with 1,000 parts by weight of tetrahydrofuran in a mixer for 3 hours, followed by drying to form a 0.5 µm thick charge generating layer. On the charge generating layer was coated a coating solution prepared by dissolving 10 parts by weight of poly(2,6-dimethoxyanthracene-9,10-diolyl dodecanedioate) and a varied amount of a hydrazone compound (produced by Fuji Electric Co., Ltd.) represented by the formula (I) below in 290 parts by weight of tetrachloroethylene to form a 20 µm thick charge transporting layer.

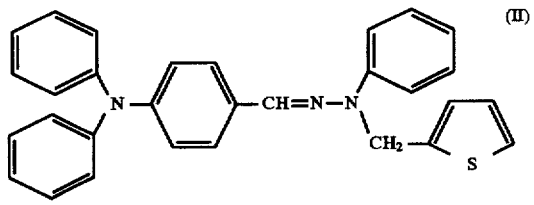

(II)

The amount of the hydrazone compound was varied as shown in Table 1 below.

The photoconductors thus obtained were mounted on a semiconductor laser printer of the wet development type and evaluated for their printability under various conditions. Table 1 shows the results obtained.

TABLE 1

| Environmental Conditions (Temperature-Humidity) | Amount of Hydrazone Compound Added (wt. %) | | | | | | |
|---|---|---|---|---|---|---|---|
| | 0 | 5 | 10 | 15 | 20 | 25 | 30 |
| 5° C.-20% RH | B | A | A | A | A | B | B |
| 25° C.-50% RH | A | A | A | A | A | B | B |
| 40° C.-80% RH | B | A | A | A | A | B | B |

Note: Symbol A indicates excellent printability, and B indicates fair printability.

As shown in Table 1, photoconductors having a charge transporting layer containing 5 to 20% by weight of a hydrazone compound maintained excellent printability under a wide variety of environmental conditions.

Example 2

A photoconductor as shown in FIG. 1 was fabricated. More particularly, on the conductive substrate 1 were formed the subbing layer 2 and the charge generating layer 3 in the same manner as in Example 1. Then, the charge transporting layer 4 made of the same material as used in Example 1 was formed, thus completing a photosensitive layer, so that the end portion 10a of the photosensitive layer 10 (including the end portions of the charge generating layer 3 and of the subbing layer 2) could be covered entirely. Thus a photoconductor was fabricated. On the other hand, a comparative photoconductor (not shown) was fabricated in the same manner as above except that the end portion 10a of the photosensitive layer 10 including the charge generating layer 3 and the subbing layer were not covered by the charge generating layer 4.

These photoconductors were mounted on a semiconductor laser printer and the condition of the photosensitive layer concerning its separation on the peripheral end portions of each photoconductor were evaluated. As a result, the comparative photoconductor showed separation of the layers after printing 1,000 sheets of A4 size paper while the photoconductor of the present invention showed no such separation even after printing 50,000 sheets of A4 size paper, thus exhibiting excellent printability.

Example 3

A photoconductor as shown in FIG. 2 was fabricated. More particularly, on the flange 12 of the conductive substrate 11 of a cylindrical shape and made of an aluminum-based material were formed the Alumite layer 6 made of a hard Alumite to a thickness of 10 µm. Subsequently, in a region of the surface of the substrate 11 where no Alumite layer 6 was formed was cut to a depth of 40 µm±10 µm and cleaned. Thereafter, in the central portion of the conductive substrate excluding the both peripheral end portions thereof were formed the subbing layer 2, the charge generating layer 3 and the charge transporting layer 4 entirely covering the subbing layer 2 and the charge generating layer 3 in the same manner as in Example 1 to obtain a photoconductor. Thus, the total thickness of the photosensitive layer constituting the photoconductor was about 21 µm and the difference between the height of the top or surface of the Alumite layer 6 and the top or surface of the charge generating layer 4 was 29 µm±10 µm.

The photoconductor thus obtained was mounted on a semiconductor laser printer provided with a squeeze roller having no stepped portion in the surface thereof and a mechanism in which upon development the peripheral end portions of the surface of the squeeze roller contact the peripheral surfaces of the peripheral end portions or flanges of the photoconductor and printing was performed. The distance between the surface of the charge transporting layer and the surface of the squeeze roller was 29 µm±10 µm so that the thickness of the layer of the developer which attached to the charge transporting layer was well controlled to 29 µm±10 µm. Thus, images of excellent quality were obtained.

By using the photoconductor having the construction described above, the amount of, or thickness of the layer of, the developer present on the charge transporting layer could be controlled precisely by merely contacting the squeeze roller having a flat surface, thus avoiding need for providing a stepped portion in the surface of the squeeze roller or for providing in the printer a separate mechanism for controlling the thickness of the layer of the developer.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A photoconductor for electrography, comprising:
a conductive substrate;
a photosensitive layer which is provided on the conductive substrate and which is comprised of:
a charge generating layer provided on the conductive substrate; and
a charge transporting layer provided on the charge generating layer as an outermost layer of the photoconductor;
wherein the charge generating layer and the charge transporting layer comprise each an organic material as a main constituent, the outermost layer comprising a poly (2,6-dimethoxyanthracene-9,10-diolyl alkanedioate) resin and a low molecular weight charge transporting material.

2. The photoconductor for electrophotography as claimed in claim 1, wherein the poly(2,6-dimethoxyanthracene-9,10-diolyl alkanedioate) resin is a poly(2,6-dimethoxyanthracene-9,10-diolyl dodecanedioate) resin.

3. The photoconductor for electrography as claimed in claim 2, wherein the low molecular weight charge transporting material is a hydrazone compound.

4. The photoconductor for electrography as claimed in claim 1, wherein the low molecular weight charge transporting material is a hydrazone compound.

5. The photoconductor for electrophotography as claimed in claim 4, wherein the hydrazone compound is contained in the outermost layer in an amount of 5 to 20% by weight based on the weight of the outermost layer.

6. The photoconductor for electrophotography as claimed in claim 1, further comprising a subbing layer positioned between the conductive substrate and the charge generating layer.

7. A photoconductor for electrophotography, comprising:
a conductive substrate;
a photosensitive layer which is provided on the conductive substrate and which is comprised of:
a charge generating layer provided on the conductive substrate; and
a charge transporting layer provided on the charge generating layer as an outermost layer of the photoconductor, the outermost layer covering one or more layers of the photosensitive layer entirely,
wherein the charge generating layer and the charge transporting layer comprise each an organic material as a main constituent, the outermost layer comprising a poly (2,6-dimethoxyanthracene-9,10-diolyl alkanedioate) resin and a low molecular weight charge transporting material.

8. The photoconductor for electrophotography as claimed in claim 7, further comprising a subbing layer positioned between the conductive substrate and the charge generating layer.

9. A photoconductor for electrophotography, comprising:
a conductive substrate;
a photosensitive layer which is provided on the conductive substrate and which is comprised of:
a charge generating layer provided on the conductive substrate; and
a charge transporting layer provided on the charge generating layer as an outermost layer of the photoconductor;
wherein the charge generating layer and the charge transporting layer comprise each an organic material as a main constituent, the outermost layer comprising a poly (2,6-dimethoxyanthracene-9,10-diolyl alkanedioate) resin and a low molecular weight charge transporting material,
wherein the conductive substrate comprises a cylinder made of an aluminum-based material having a non-coated region in a surface of the conductive substrate in each peripheral end portion thereof, and
wherein an Alumite layer is provided on the peripheral end portion, which Alumite layer has a height larger than that of the outermost layer.

10. The photoconductor for electrophotography as claimed in claim 9, further comprising a subbing layer positioned between the conductive substrate and the charge generating layer.

11. The photoconductor for electrophotography as claimed in claim 10, wherein a difference between the height of the surface of the outermost layer of said photosensitive layer and that of the surface of said Alumite layer is 29 μm ±10 μm.

12. The photoconductor for electrophotography as claimed in claim 9, wherein a difference between the height of the surface of the outermost layer of the photosensitive layer and that of the surface of the Alumite layer is 29 μm±10 μm.

13. The photoconductor for electrophotography as claimed in claim 9, wherein the poly(2,6-dimethoxyanthracene-9,10-diolyl alkanedioate) resin is a poly(2,6-dimethoxyanthracene-9,10-diolyl dodecanedioate) resin.

14. The photoconductor for electrography as claimed in claim 13, wherein the low molecular weight charge transporting material is a hydrazone compound.

15. The photoconductor for electrography as claimed in claim 9, wherein the low molecular weight charge transporting material is a hydrazone compound.

16. The photoconductor for electrophotography as claimed in claim 15, wherein the hydrazone compound is contained in the outermost layer in an amount of 5 to 20% by weight based on the weight of the outermost layer.

17. The photoconductor for electrophotography as claimed in claim 7, wherein the poly (2,6-dimethoxyanthracene-9,10-diolyl alkanedioate) resin is a poly(2,6-dimethoxyanthracene-9,10-diolyl dodecanedioate) resin.

18. The photoconductor for electrophotography as claimed in claim 17, wherein the low molecular weight charge transporting material is a hydrazone compound.

19. The photoconductor for electrophotography as claimed in claim 7, wherein the low molecular weight charge transporting material is a hydrazone compound.

20. The photoconductor for electrophotography as claimed in claim 19, wherein the hydrazone compound is contained in the outermost layer in an amount of 5 to 20% by weight based on the weight of the outermost layer.

* * * * *